United States Patent

Cheng

Patent Number: 5,394,827
Date of Patent: Mar. 7, 1995

[54] DRAFT TUBE, DIRECT CONTACT CRYOGENIC CRYSTALLIZER

[75] Inventor: Alan T. Cheng, Livingston, N.J.

[73] Assignee: Praxair Technology, Inc., Danbury, Conn.

[21] Appl. No.: 272,978

[22] Filed: Jul. 15, 1994

Related U.S. Application Data

[60] Division of Ser. No. 11,064, Jan. 29, 1993, Pat. No. 5,362,455, which is a continuation-in-part of Ser. No. 789,048, Nov. 7, 1991, abandoned, which is a continuation-in-part of Ser. No. 518,521, May 3, 1990, abandoned.

[51] Int. Cl.⁶ .............................. C30B 7/08
[52] U.S. Cl. ............................ 117/206; 117/11; 117/200
[58] Field of Search ............ 23/273 R; 117/11, 200, 117/202, 204, 206, 919

[56] References Cited

U.S. PATENT DOCUMENTS

| | | | |
|---|---|---|---|
| 3,599,701 | 8/1971 | Mollerstedt et al. | 422/253 |
| 3,873,275 | 3/1975 | Bennett | 23/273 R |
| 3,895,920 | 7/1975 | Garrett | 23/298 |
| 4,022,820 | 5/1977 | Johnson | 422/245 |
| 4,144,308 | 3/1979 | Johnson | 422/245 |
| 4,429,535 | 2/1984 | Featherstone | 60/641.5 |
| 4,479,351 | 10/1984 | Awerbuch et al. | 60/641.5 |
| 4,689,146 | 8/1987 | Kasai et al. | 210/197 |

FOREIGN PATENT DOCUMENTS

| | | |
|---|---|---|
| 393136 | 1/1933 | Belgium . |
| 180796 | 5/1986 | European Pat. Off. . |
| 2305496 | 10/1976 | France . |
| 1047174 | 11/1966 | United Kingdom . |
| 703114 | 12/1979 | U.S.S.R. ............ 422/245 |
| 719652 | 3/1980 | U.S.S.R. ............ 422/245 |

OTHER PUBLICATIONS

Crystal Growth, pp. 542,543, Direct Contact Cooling.

Primary Examiner—R. Bruce Breneman
Assistant Examiner—Felisa Garrett
Attorney, Agent, or Firm—Stanley Ktorides

[57] ABSTRACT

A direct contact cryogenic crystallizer having a vertically oriented draft tube into which cryogenic fluid is injected at a high velocity along with warm gas and through which a crystal slurry is drawn for subsequent cooling and agitation for the production of crystals.

7 Claims, 3 Drawing Sheets

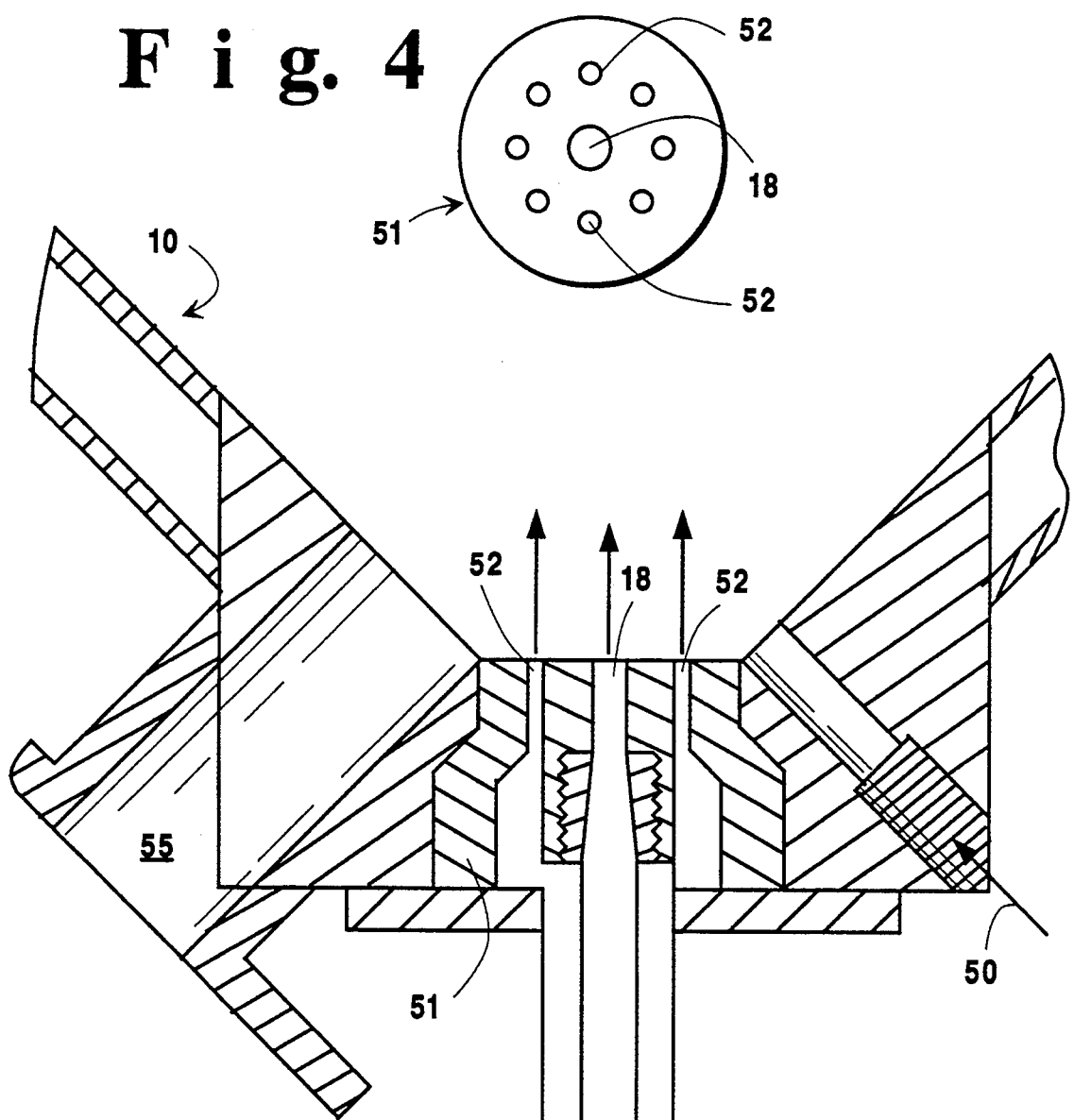
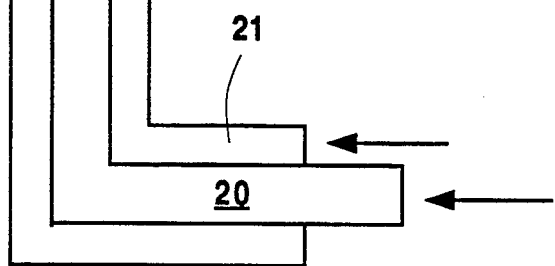

DRAFT TUBE, DIRECT CONTACT CRYOGENIC CRYSTALLIZER

This application is a division of prior U.S. application Ser. No. 011,064, filing date Jan. 29, 1993, now U.S. Pat. No. 5,362,455, and/which is a continuation in part of application Ser. No. 789,048, now abandoned, filing date Nov. 7, 1991, which is a continuation in part of application Ser. No. 518,521, filing date May 5, 1990, now abandoned.

FIELD OF THE INVENTION

The invention relates to a direct contact crystallizer. In particular, the invention is a draft tube, direct contact crystallizer employing a nozzle injection system which enables the use of cryogenic fluid such as gaseous or liquid nitrogen to simultaneously cool and agitate a crystal slurry for the production of crystals.

BACKGROUND OF THE INVENTION

Continuous suspension of crystallizing solids and supersaturated liquid is very important for growing uniform crystals. A direct contact crystallizer is used to prevent fouling on heat transfer surfaces. Early designs of direct contact crystallizers used high volumes of refrigerants injected through spargers or distributors. Examples of refrigerants suggested for use in direct contact crystallizers include freon, water, alcohol solution, butane, propane, and air. However, these crystallizers have a very limited operating temperature range and have failed to provide true solid suspension or thorough mixing.

The only commercially operated direct contact crystallizers use mechanical units to recompress refrigerants such as propane or butane. These mechanical-type crystallizers are equipped with agitators for vigorously stirring the slurry and keeping the crystals in suspension. The speed of the agitator must be fast enough to prevent large crystals from settling and coagulating in the bottom of the vessel. However, fast rotating agitators can break down large crystals on impact. In addition to breaking down large crystals, the impact of crystals on the mechanically agitated surfaces of other crystals promotes secondary nucleation. Secondary nucleation is the cause of excess fine crystals which are difficult to filter and are easily caked, thus, requiring recycling.

It is known that a cryogenic liquid or gas is able to provide a large amount of refrigeration to a crystal slurry. The other advantage of a cryogenic fluid such as liquid nitrogen is that it is inert and will not contaminate the crystal slurry. However, it has not heretofore been possible to use such cryogenic fluids with conventional crystallizers. In conventional direct contact crystallizer practice, gas or liquid coolant is passed into a solution through a distributor which distributes the coolant over a wide area causing the coolant to bubble throughout the solution. By means of such coolant distribution, effective heat transfer with the solution is attained. The conventional practice of coolant introduction through a distributor, while effective in conventional crystallization practice, is inadequate if a cryogenic gas or liquid were to be employed as the coolant. In theory, holes are drilled uniformly on a distributor surface so that gas bubbles of the same size will distribute evenly over a wide body of liquid. However, it is not possible to manufacture a truly uniform distributor in practice. As a result, more gas will flow through larger holes where the pressure drop is lower. Therefore uniform gas velocity on each of the distributor holes cannot be maintained. Fluctuation of gas pressure due to the release of each individual gas bubble from the holes makes the situation more complicated. Subsequently, liquid will flow back through those apertures of the distributor where the gas velocity is lowest. This has not been a major problem in conventional practice other than experiencing some loss in sparging efficiency and in the need for periodic clean-up. However, if a cryogenic gas or liquid, such as nitrogen at a temperature less than $-200°$ F., were to be employed as the coolant, such liquid inflow would result in freezing and fouling of those apertures of the distributor. Increasing the supply pressure to the distributor will not alleviate the problem since the larger holes will form excessively large bubbles which will result in unacceptably poor heat transfer. A vaporizing cryogenic fluid will expand hundreds of times in volume. Supply pressure usually fluctuates substantially with a cryogenic fluid. A distributor will not be able to control such a wide fluctuation in pressure thus resulting in an efficiency loss.

Accordingly, it is an object of this invention to provide a direct contact crystallizer and crystallization method which will enable one to effectively employ a cryogenic fluid as the coolant.

SUMMARY OF THE INVENTION

The direct contact crystallizer and crystallization method of this invention improves solid suspension while reducing secondary nucleation in a crystal slurry by employing a cryogenic fluid as the crystallizing coolant.

In particular, one aspect of the invention is:

A direct contact cryogenic crystallizer comprising:

(A) a crystallizer vessel;

(B) a draft tube positioned within said crystallizer vessel with the lower end of said draft tube spaced from the bottom surface of said vessel;

(C) an injection nozzle positioned for injecting fluid into said draft tube;

(D) means for providing cryogenic fluid through said injection nozzle; and (E) means for providing warm gas through said injection nozzle.

Another aspect of the invention is:

A method for producing crystals comprising:

(A) providing a crystal slurry in a crystallizer vessel having a draft tube positioned within said crystallizer vessel with the lower end of said draft tube spaced from the bottom surface of said crystallizer vessel;

(B) injecting cryogenic fluid through an injection nozzle into the crystallizer vessel and contacting the cryogenic fluid with the crystal slurry within the draft tube to produce crystals;

(C) injecting warm gas having a temperature above the freezing point of the slurry solvent through said injection nozzle into the crystallizer for at least a portion of the time that cryogenic fluid is being injected into the crystallizer vessel; and (D) withdrawing crystals from the crystallizer vessel.

The direct contact crystallizer and crystallization method uses a draft tube assembly in combination with a cryogenic fluid nozzle injection system to simultaneously cool and agitate the crystal slurry. Although draft tubes have been used in conventional crystallizer designs, such conventional crystallizers having draft tubes typically require the use of mechanical agitators or recirculation pumps. Such mechanical agitators or recirculation pumps are not required in the practice of this invention.

FIG. 3 is a cross-sectional representation of one embodiment of the injection nozzle useful in the practice of this invention.

FIG. 4 is a head-on view of the injection nozzle illustrated in FIG. 3.

DETAILED DESCRIPTION OF THE INVENTION

Figure 1:
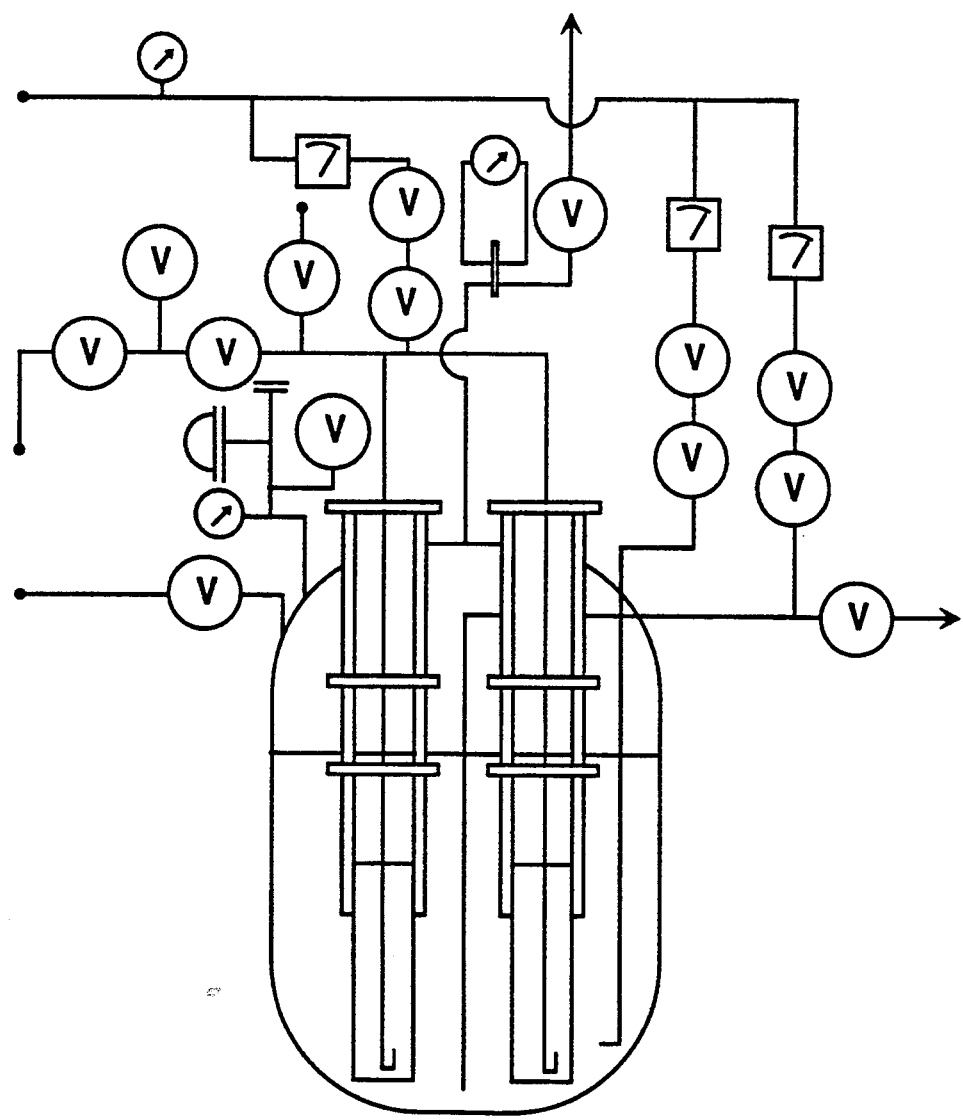
FIG. 1 is a simplified illustration of one embodiment of the invention.

Referring now to FIG. 1, there is illustrated a crystallizer vessel which, in this case, houses two draft tubes. Crystal slurry is provided in the crystallizer vessel and product crystals are withdrawn from the crystallizer vessel. Cryogenic fluid and warm gas are provided into the crystallizer vessel to carry out the efficient production of crystals by contact with the crystal slurry. In the embodiment illustrated in FIG. 1, the cryogenic fluid is liquid nitrogen and the warm gas is gaseous nitrogen.

The invention will be described in greater detail with reference to FIGS. 2, 3 and 4.

Figure 2:
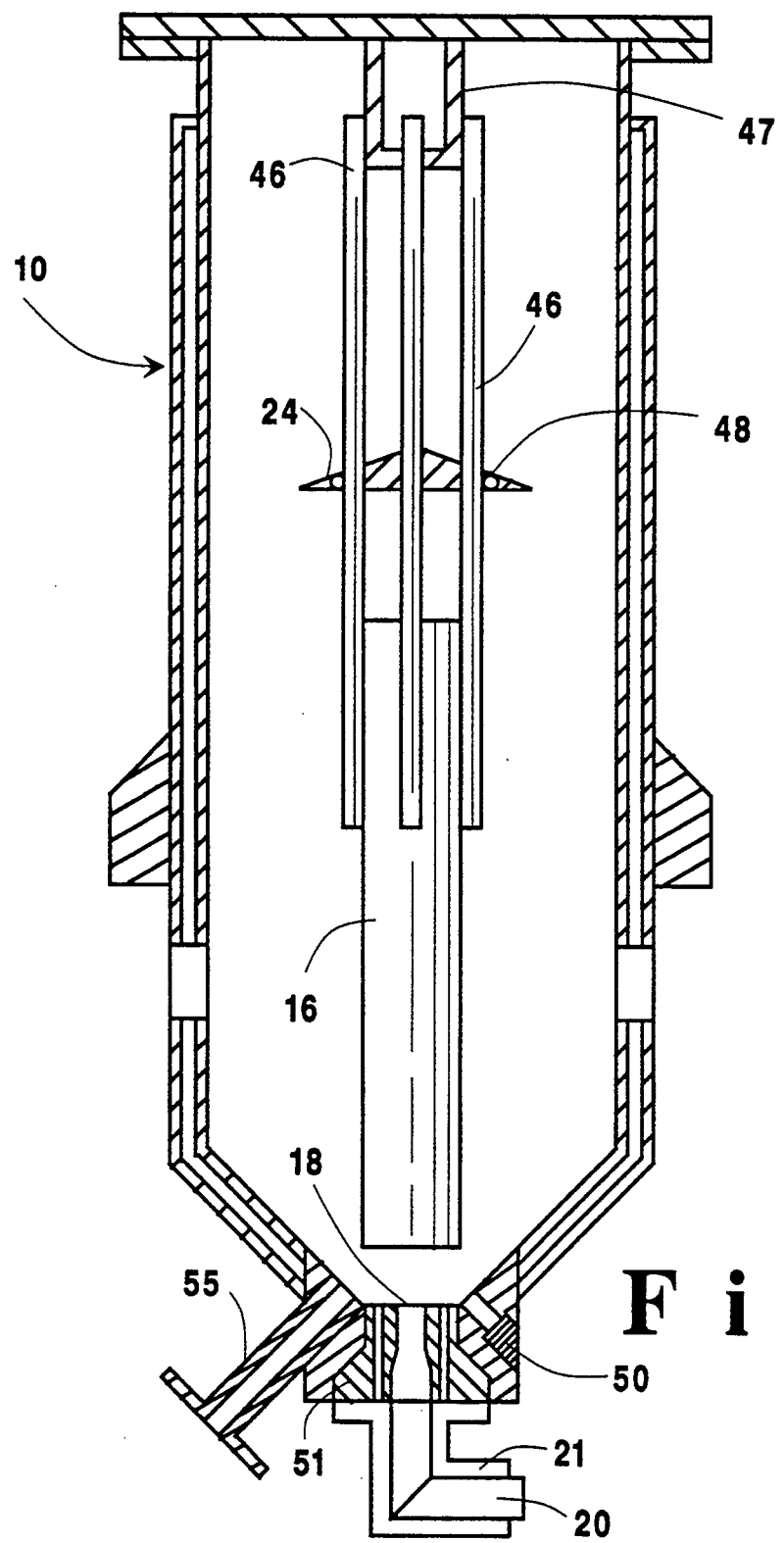
FIG. 2 is a detailed cross-sectional representation of one embodiment of the invention.

Referring to FIG. 2, the draft tube, direct contact cryogenic crystallizer of this invention uses a cryogenic fluid such as gaseous or liquified nitrogen to simultaneously cool and agitate a crystal slurry which may be provided into crystallizer vessel 10 through slurry feed conduit 50. As used herein, the term "cryogenic fluid" means a fluid at a temperature of −109° F. or less. The direct contact crystallizer can be used to crystallize, for example, potassium thiosulfate, citric acid, sodium thiosulfate, paraxylene, sodium hydroxide, sodium sulfate, potassium chloride, lactose, boric acid, or any organic, inorganic, or pharmaceutical chemical that can be separated from a solvent by cooling or evaporative crystallization. It can also be used for winterizing edible oils, purifying antibiotics, aerating water tanks, and dewatering organic chemicals such as by freezing the water into ice crystals.

The crystal slurry is a suspension of solid crystals in a supersaturated solution comprising a solvent. The supersaturated solution is formed by dissolving a solute in a solvent at a higher temperature or a lower concentration. By decreasing the temperature and/or increasing the concentration, for example by evaporation, the solution becomes supersaturated.

A vertical draft tube 16 is installed preferably at the center of a crystallizer vessel 10. The draft tube 16 and the vessel 10 can be made of any materials compatible with the chemical to be crystallized. Suitable materials include stainless steel and glass. The draft tube is supported by supports to which it is welded. The supports, in turn, are fixed to the top plate of the crystallizer by attachment to tube 47.

The physical dimensions of the vessel 10 and draft tube 16 can vary. However, there are certain limitations. The vessel 10 can be as large or small as construction parameters will allow. The diameter of the draft tube 16 can range from 1 percent to 70.7 percent (i.e., the square root of ½) of the vessel diameter. When the draft tube is 70.7 percent of the vessel diameter, the cross-sectional area inside the draft tube is approximately the same as the cross-sectional area outside the draft tube 16. Preferably, the diameter of the draft tube 16 is 10 to 20 percent of the vessel diameter to achieve sufficient turbulence and uplift. For a very large vessel, multiple draft tubes can be provided instead of a single draft tube. Furthermore, for a very large draft tube, multiple injection nozzles may be used.

The lower end of the draft tube is spaced from the bottom of the crystallizer vessel. The distance between the opening at the lower end of the draft tube 16 and the bottom surface of the vessel 10 is approximately calculated as one-fourth (¼) or more of the inside diameter of the draft tube. This opening generally has the same area as inside the draft tube. Thus, the fluid velocity at the opening is the same as inside the draft tube. The height of the draft tube may be adjusted. However, the upper end of the draft tube will always be spaced from the top surface of the crystallizer vessel to ensure adequate fluid flow through the draft tube.

An injection nozzle 18 is positioned at the bottom of the crystallizer vessel 10 and pointed vertically upward to inject cryogenic fluid vertically upward into the draft tube.

The nozzle 51 is used to inject the cryogenic fluid such as gaseous or liquid nitrogen directly into the crystallizer 10. The nozzle wall is thick enough so that the temperature on the outside of the nozzle 51 is close to the temperature of the crystal slurry. The nozzle has passing through it a cryogenic fluid nozzle passage 18 for ejecting cryogenic fluid into the crystallizer vessel. The diameter of the nozzle passage 18 is reduced in a portion of the nozzle length so as to increase the injection velocity of the cryogenic fluid. This increased injection velocity assists in preventing liquid from reentering the nozzle. Furthermore, the increased velocity causes the cryogenic fluid to cause turbulence inside the draft tube and, moreover, to experience a sudden release of pressure at the upper end of the draft tube thus enhancing the mixing and anti-nucleation effects of the invention. The heat transfer rate is enhanced by the turbulence inside the draft tube.

The nozzle 51 is preferably constructed of fluorocarbon such as polytetrafluoroethylene to prevent ice or crystals from adhering to the nozzle wall. Fluorocarbons give the best non-wetting properties with low thermal conductivity so that ice or crystals will not adhere to the surface. However, the nozzle can be made of any materials or multiple layers of materials that exhibit good non-wetting, low thermal conductivity, thermal shock resistance properties. Fluorocarbons are generally not employed as nozzle materials because they are soft. However, when employed with a cryogenic fluid, the low temperature causes the fluorocarbon to harden and thus form an effective nozzle. This enables one to advantageously employ the known non-sticking attributes of fluorocarbons. Particles which might form at the nozzle due to the cryogenic temperatures adhere only loosely, if at all, to the nozzle. With the high pressure flow of coolant through the nozzle and subsequent resulting turbulence, such loosely adhering particles are swept away and do not lead to fouling of the crystallizer or nucleation within the crystallizer.

Nozzle 51 also includes at least one, and referably a plurality, of warm gas passages 52 for passing warm gas through nozzle 51 and into crystallizer vessel 10. The warm gas is passed to nozzle 51 through conduit 21 and has a temperature of at least above the freezing point of the solution or solvent of the crystal slurry. For example, if the solvent of the crystal slurry were water, the warm gas would have a temperature of 0° C. or more. Generally, the warm gas will be at a temperature exceeding −109° F. Preferably, the temperature of the warm gas is within the range of from the freezing point to the boiling point of the solvent of the crystal slurry. Preferably the warm gas is chemically identical with the cryogenic fluid. Most preferably the cryogenic fluid is liquid and/or gaseous nitrogen and the warm gas is gaseous nitrogen such as may be generated by separation from air using cryogenic rectification, pressure swing adsorption or membrane separation.

The warm gas is passed through injection nozzle 51 and into crystallizer vessel 10 and draft tube 16 for at least a portion of the time that cryogenic fluid is being injected into the crystallizer vessel. The warm gas is especially useful during startup and shutdown of the crystallizer system. The warm gas performs a number of functions simultaneously to overcome the difficulties encountered with the use of cryogenic fluid thus enabling the effective use of cryogenic fluid to carry out the crystallization. The warm gas maintains pressure inside the nozzle to keep crystal slurry from flowing into the nozzle. The warm gas maintains the nozzle temperature at a level which prevents freezing of fluid on or within the nozzle. The warm gas increases or maintains the recirculation through the draft tube especially when the crystals have grown in size and the slurry becomes heavier. The warm gas recovers any heat loss from the cryogenic fluid to be reinjected into the crystal slurry.

The cryogenic fluid linear injection velocity should be large enough to prevent back-fill of liquid and ice crystal adhesion. Preferably the linear or injection velocity is not less than about 10 ft/sec. Gas is preferably injected at sonic velocity (e.g., about 1,000 ft/sec) and liquid is injected at subsonic speed but preferably achieves sonic velocity as it vaporizes. Smaller gas bubbles than are attainable with conventional processes are formed at a high injection velocity and these finer gas bubbles achieve a better heat transfer rate. On the other hand, these small bubbles formed are still larger than the cross section of a crystal. Therefore voids, which are present as is the case when gas is dispersed with a mechanical agitator, are avoided. Smaller or finer gas bubbles enable a greater likelihood for total thermal equilibrium or utilization of the cooling value of the cryogenic fluid. The velocity of the crystal slurry through the draft tube is great enough to suspend the solids and is greater than the terminal settling velocity of the crystals.

The volumetric flow rate of the cryogenic fluid such as liquid or gaseous nitrogen depends on the cooling rate of the crystal slurry which is affected by the size and type of slurry. A higher cooling/evaporative rate will reduce the total batch time, but the cooling rate generally should not create more than 3° F. of supersaturation. Excess driving force due to supersaturation will create abnormal crystal growth.

If liquid nitrogen is employed, the temperature of the liquid nitrogen is preferably at or lower than its boiling point of −196° C. (77° K.). Gaseous nitrogen can be at any cryogenic temperature. The colder the gas available, the better the cooling value.

The crystal slurry can be controlled at any temperature depending on the type of chemicals and the amount of crystal to be recovered. More crystals can be recovered at a lower slurry temperature. However, this lower temperature may be more costly per pound of crystal to be recovered. Furthermore, crystal phase may also change. The lowest temperature limit generally will be the boiling point of the cryogenic fluid.

A well-insulated transfer tube or pipe 20 is used to transfer cryogenic fluid such as high-quality gaseous or liquid nitrogen to nozzle 51. The transfer pipe 20 preferably has a double wall construction to minimize freezing in the outer wall. This double wall construction is also important to keep liquid nitrogen, for example, from vaporizing inside the tube.

In operation, the nozzle 51 injects through passage 18 cryogenic fluid such as gaseous or liquid nitrogen directly into crystallizer vessel 10. As the gas and/or liquid are injected at the high velocity, such as sonic velocity, resulting from the nozzle injection, fine gas bubbles are formed due to shockwaves. These fine gas bubbles have a high surface area for heat transfer. Yet the bubbles are bigger than the cross sectional area of the crystals. Therefore, the potential problems of the formation of voids is prevented. Thus, the nozzle allows better utilization of the cooling value.

Due to the presence of draft tube 16, both the fluid and the solids flow upwardly and the solids remain suspended and continuously circulate as long as the drag force of gas bubbles within the draft tube is greater than the gravitational force minus the buoyancy force of the solids.

The draft tube 16 is positioned so that the opening between the lower end of the draft tube 16 and the bottom of the crystallizer vessel 10 is large enough so that fluid velocity will be greater than settling velocity of the crystals. The draft tube creates sufficient turbulence so that thermal equilibrium can be achieved and the exiting gas has the same temperature as the bulk of the liquid. Also, the high slurry velocity inside the draft tube 16 prevents ice formation and fouling by reducing the thermal boundary layer next to any cold surfaces.

No mechanical agitators or re-circulation pumps are necessary in the direct contact cryogenic crystallizer of this invention. The crystals are suspended and circulated by the high velocity gas bubbles rising from the injection nozzle. The direct contact cryogenic crystallizer and method of the invention forms crystals of uniform shape and narrow size distribution, and minimizes fouling of heat exchanger surfaces.

The largest crystals will settle fastest and are the first to contact the cold fluid from the injection nozzle passage 18 where supersaturation is at its maximum. Subsequently, the larger crystals receive a higher recirculation and growth rate than the smaller crystals. As a result, this crystallizer configuration not only minimizes secondary nucleation, but also enhances the growth rate of the larger crystals.

As the high velocity gas bubbles reach the top of a draft tube 16, a sudden release of pressure occurs, thereby resulting in extremely turbulent mixing of the gas bubbles and the crystal slurry. The momentum due to the upward thrust of the gas bubbles rising through the draft tube 16 is usually dissipated as waves and splashes. However, a submerged baffle 24 is preferably positioned above the upper end of the draft tube and is used to change the direction of the three phase mixture before any significant amount of gas is separted from the mixture. The baffle plate at this position effectively works in concert with the sudden pressure release at the top of the draft tube resulting from the nozzle injection into and through the draft tube to improve the good distribution and anti-nucleation properties of the invention.

The submerged baffle 24 can be a plate or an inverted cone. The baffle 24 can be any shape as long as it does not trap a significant amount of gas bubbles to form a gas-liquid interface. Preferably, the baffle contains one or more perforations 48 which serve to limit gas bubble trapping. By positioning the baffle 24 below the liquid level 26 but above the draft tube 16, the buoyancy force is converted into rotational force. Dead spaces are eliminated as the intensity of horizontal agitation is increased and recirculating loops are formed to sweep any settled crystals into the draft tube 16. Placing the baffle 24 below the liquid level substantially reduces the waves and splashes.

Finished crystals may be removed from crystallizer vessel 10 either by pump or by pressure transfer through conduit 55. Crystals are ready for removal when the sizes are large enough or within specifications. In commercial practice, crystals are removed when a certain desired temperature is reached.

The crystallizer of this invention is especially suitable for crystals which have a very limited temperature range at which crystallization can occur. By increasing the heat load at recirculation, the crystallizer can be isothermally operated and super-saturation can be driven only by concentration gradient.

It is desirable to employ a coolant at a cryogenic temperature in a direct contact crystallizer because of the much greater refrigeration available per unit volume of coolant. Direct contact crystallizing has been carried out for many years. However, a cryogenic coolant has not heretofore been employed for direct contact crystallizing because of fouling, nucleation and distribution problems. The present invention, combining cryogenic fluid injection, a draft tube and warm gas injection preferably concentric with the cryogenic fluid injection into the draft tube, enables one to effectively employ a cryogenic coolant for direct contact crystallizing while avoiding fouling, nucleation and distribution problems. Although the invention has been described in detail with reference to certain embodiments, those skilled in the art will recognize that there are other embodiments of the invention within the spirit and the scope of the claims.

I claim:

1. A direct contact cryogenic crystallizer comprising:
   (A) a crystallizer vessel;
   (B) A draft tube positioned within said crystallizer vessel with the lower end of said draft tube spaced from the bottom surface of said vessel;
   (C) an injection nozzle positioned for injecting fluid into said draft tube;
   (D) means for providing cryogenic fluid through said injection nozzle; and
   (E) means for providing warm gas at a temperature exceeding $-109°$ F. through said injection nozzle.

2. The direct contact cryogenic crystallizer of claim 1 where the means for providing cryogenic fluid through the injection nozzle comprises a central conduit through the injection nozzle and the means for providing warm gas through the injection nozzle comprises a plurality of conduits oriented around said central conduit.

3. The direct contact crystallizer of claim 2 wherein said central conduit has a reduced diameter over a portion of its length.

4. A direct contact cryogenic crystallizer of claim 1 further comprising a baffle positioned above said upper end of said draft tube.

5. The direct contact cryogenic crystallizer of claim 4 wherein said baffle contains one or more perforations.

6. The direct contact crystallizer of claim 1 wherein the draft tube has a height which is adjustable.

7. The direct contact cryogenic crystallizer of claim 1 wherein the injection nozzle is comprised of fluorocarbon.

* * * * *